United States Patent [19]
Tomatsuri et al.

[11] Patent Number: 5,600,221
[45] Date of Patent: Feb. 4, 1997

[54] CONTROL APPARATUS FOR SERVO SYSTEM

[75] Inventors: Kazuhiko Tomatsuri; Misako Okada; Yusuke Ushio; Yuko Tomita; Satoshi Mizogami, all of Aichi, Japan

[73] Assignee: Mitsubishi Denki Kabushiki Kaisha, Tokyo, Japan

[21] Appl. No.: 436,011

[22] Filed: May 5, 1995

[30] Foreign Application Priority Data

May 9, 1994 [JP] Japan .................................. 6-095285
Mar. 17, 1995 [JP] Japan .................................. 7-059254

[51] Int. Cl.⁶ .................................................. G05D 3/00
[52] U.S. Cl. .................................... 318/632; 318/601
[58] Field of Search .................................... 318/567, 696, 318/685, 600, 632, 601; 364/478, 476, 474.06

[56] References Cited

U.S. PATENT DOCUMENTS 3,970,830 7/1976 White et al. .......................... 318/567
4,378,592 3/1983 Heiberger et al. ..................... 364/476
4,873,793 10/1989 Asano et al. ...................... 364/474.06

FOREIGN PATENT DOCUMENTS 5073147 3/1993 Japan .

*Primary Examiner*—John W. Cabeca
*Attorney, Agent, or Firm*—Sughrue, Mion, Zinn, Macpeak & Seas

[57] ABSTRACT

A control apparatus for a servo system uses a servo motor to perform operations equivalent to those of a cam mechanism. A motion command section has two data tables which are used to calculate and output a position command and a velocity compensation command equivalent to a cam stroke. A servo drive section makes velocity compensation and current compensation on the basis of position and velocity compensation commands. The motion command section, alternatively, may have three data tables for the calculation of the compensation commands. In addition, multipliers are used to adjust the weight of the compensation commands. Rather than the data tables being present in the motion command section, they may be placed in the servo drive section. Formulae representing the mechanical characteristics of the cam system may be used in place of the data tables.

11 Claims, 15 Drawing Sheets

40 — ADDRESS WITHIN ONE REVOLUTION
41 — VELOCITY COMPENSATION COMMAND

42 — ADDRESS WITHIN ONE REVOLUTION
43 — CURRENT COMPENSATION COMMAND

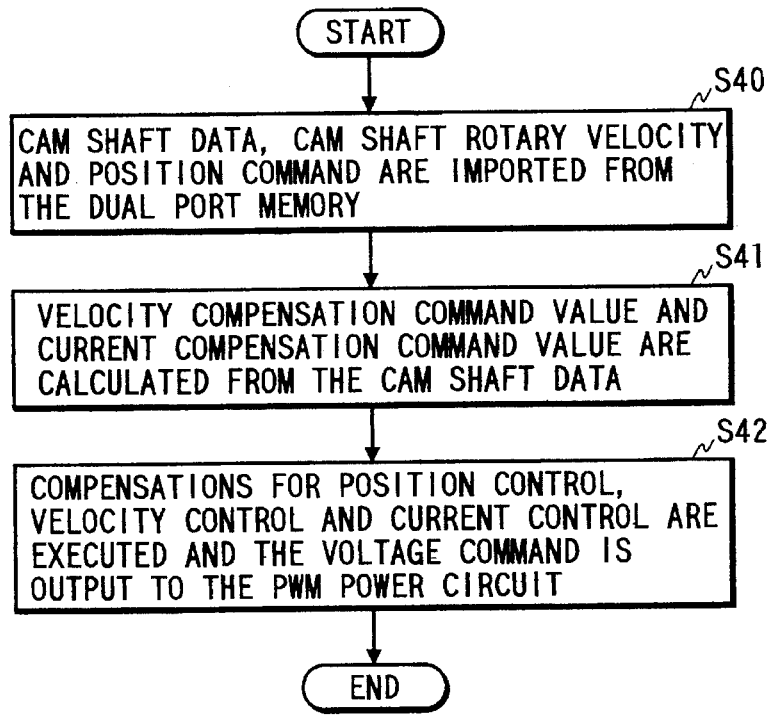
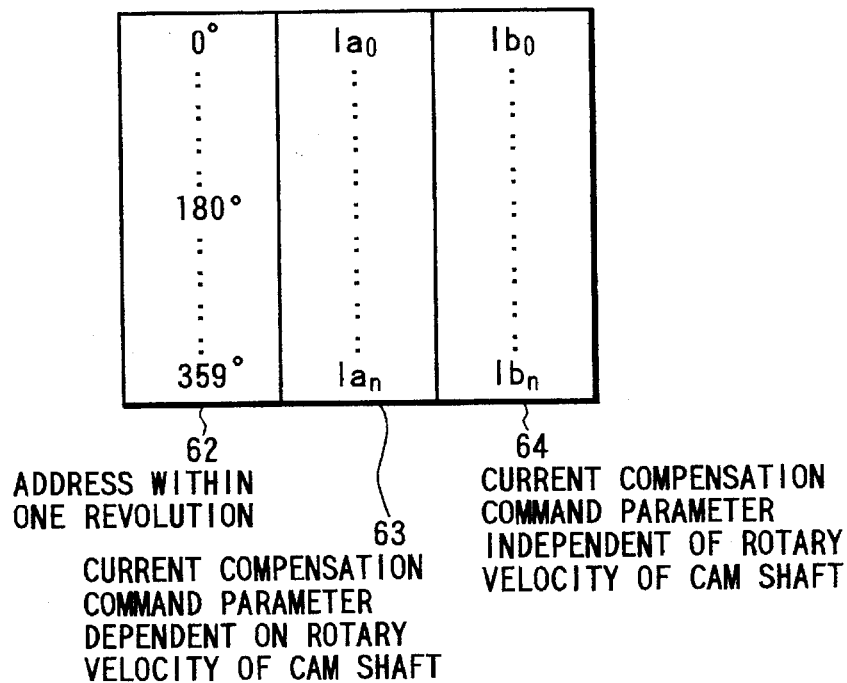

CONTROL APPARATUS FOR SERVO SYSTEM

FIELD OF THE INVENTION

The present invention relates to a control apparatus for a servo system which requires high accuracy for cam control operation.

BACKGROUND OF THE INVENTION

Conventionally, a mechanical cam which operates in cooperation with the motion of a cam attached to a shaft has been used. Utilizing this mechanical cam, however, has the added difficulty of adjusting a cam pattern, therefore, an electronic cam has come into wide use. The electronic cam conducts the cam operation using a relationship between the rotation of the cam and cam configuration data which has been stored in advance. A rotation position of the shaft is detected before the servo motor is controlled on the basis of the detected value.

As seen in FIG. 15, a functional block diagram shows a conventional control apparatus for a servo system which controls an electronic cam. Cam shaft data 22 represents the rotary angle of a cam shaft within one revolution, where the shaft is assumed to be attached to a cam. A processing block 100, which represents the concept of the processing of the microprocessor within a motion command section, receives the cam shaft data 22 and processes a position command for executing the operation of the electronic cam. The processing block 100 contains a cam configuration data table, hereinafter referred to as a position command table 23, where cam configuration data has been stored. A position command 29 is output by the processing block 100. A second processing block 101 representing the concept of the processing of the microprocessor found within a servo drive section receives the position command 29. The second processing block 101 contains a position control processor 32, a velocity control processor 33 and a current control processor 34. The second processing block 101 receives current position information 35 of a motor to be controlled, velocity information 36 of the motor to be controlled and a current value 37 of the motor to be controlled. Finally, the second processing block 101 outputs a voltage command 38 for driving the motor to be controlled.

An arithmetic processor 80 within the second processing block 101 subtracts the current position information 35 from the position command 29 and outputs a value to the position control processor 32. An arithmetic processor 91 subtracts the velocity information 36 from a velocity command calculated and output by the position control processor 32. An arithmetic processor 92 subtracts the current value 37 from the current command calculated and output by the velocity control processor 33.

Turning to FIG. 16, there is shown one example of the position command table 23 in the conventional control apparatus for the servo system which controls the electronic cam. In the figure, position addresses 280 are stored which represent one revolution of the cam shaft, where one revolution of the cam shaft is divided at regular intervals, e.g., 2000 divisions which represent equally spaced angles, i.e., 2000 angles. Cam operation values 281 of the cam corresponding to the position addresses 280 are also stored. In this situation, the cam operation values 281 are positional values between 0 and 1 within one revolution of the cam shaft (0=top dead center of a cam operation stroke, 1=bottom dead center of the same).

The operation of the motion command section will now be described. As seen in FIG. 17, a flowchart represents the processing of the motion command section in the conventional control apparatus for the servo system which controls the electronic cam.

The current position information 35 of the cam shaft is received in step S201.

Next, the position information of the cam within one revolution is obtained from the cam shaft data represented by the remainder resulting from the current position of the cam shaft by one revolution value (360°) in step S202.

Subsequently, referring to the position command data table 23, the cam operation value 281 corresponding to the cam shaft data is obtained in step S203 (the details will be described in FIG. 18).

The position command for continuously conducting the reciprocating motion of the cam is calculated as $(h_1 \times D) + h_2$ from the cam operation value D corresponding to the rotation position information A of the cam shaft, a stroke value setting value $h_1$ and a stroke lower limit position setting value $h_2$ which have been previously stored in a region for a variable in step S204. This is a motion of reciprocation between the lower position setting value $h_2$ and the upper limit position $(h_1 + h_2)$ of the cam motion.

The position command 29 is outputted to the servo drive section in step S205.

A flowchart representing the calculating of the operation value of the cam corresponding to the rotation position information of the cam shaft is shown in FIG. 18. The motion command section in the conventional control apparatus for the servo system controls the electronic cam as shown in this flowchart.

In step S1170, $A_1$ and $A_2$ closest to A, among the position addresses within one revolution of the cam shaft, where $A_1 \leq A < A_2$, is searched from the position command data table 23. The rotation position information A of the cam shaft was calculated in step S202 of FIG. 17.

Thereafter, the cam motion values corresponding to the position addresses $A_1$ and $A_2$ within one revolution are obtained from the position command table in step S1171, indicated by $D_1$ and $D_2$ in FIG. 16.

The cam motion value D corresponding to the rotation position information A of the cam shaft is calculated from the position addresses $A_1$ and $A_2$ and the cam motion value $D_1$ and $D_2$ within one revolution in step S1172 on the basis of the following formula.

$$D = D_1 + (D_2 - D_1) \times \{(A - A_1)/(A_2 - A_1)\}$$

This is to make a proportional distribution calculation on the basis of the position address within one revolution because the cam motion value stored in the cam configuration data table is discrete with respect to the position address within one revolution of the cam shaft.

Next, the operation of the servo drive section will be described. As seen in FIG. 19, a flowchart represents the processing of the position control processor 32 in the second processing block 101 within the servo drive section of FIG. 15. Turning to FIG. 20, there is a flowchart representing the processing of the velocity control processor 33 in the second processing block 101. A flowchart representing the processing of the current control processor 34 in the second processing block 101 is shown in FIG. 21.

In step S101, the position control processor 32 receives a difference between the position command 29 outputted from the motion command section 100 and the motor current position information 35. A motor travel velocity is calculated from the difference between the current position information 35 and the position command 29 in step S102. The calculated motor travel velocity (velocity command) is outputted to the velocity control processor 33 in step S103.

In the velocity control processor 33, a difference between the velocity command calculated by the position control processor 32 and the motor velocity data 36 is received in step S104. Current given to the motor is calculated from the difference between the motor velocity data 36 and the velocity command in step S105. The calculated current value (current command) is outputted to the current control processor 34 in step S106.

As shown in the flowchart of FIG. 21, the current control processor 34 receives a difference between the current command calculated by the velocity control processor 33 and the motor current data 37 in step S107. A voltage command 38 output to a PWM power circuit is calculated from the difference between the current data 37 and the current command in step S108. The calculated voltage command 38 is outputted to the PWM power circuit section (not shown) within the servo drive section in step S109. The PWM power circuit section drives the motor by controlling the current to the motor on the basis of the voltage command 38.

SUMMARY OF THE INVENTION

There is a disadvantage, however, to the foregoing conventional control apparatus for the servo system which controls the electronic cam. As the rotary velocity in the cam shaft data increases and the variation of the position command based on the cam stroke increases, a deviation resulting from servo control exercised only under the position command in the servo motor drive section will also increase. This prevents proper cam operation from being achieved in a cam pattern.

The present invention has been made to solve the foregoing problems, and an object of the invention is to provide a control apparatus in a servo system which is capable of realizing cam operation in a cam pattern even though the rotation velocity of the cam shaft increases.

In order to achieve the above objects, there is provided a control apparatus for a servo system which uses a servo motor to perform operations equivalent to those of a cam mechanism. This apparatus comprises a motion command section having a first data table and a second data table for a position command and a velocity compensation command, respectively. The apparatus calculates and outputs the position command equivalent to a cam stroke in the cam mechanism and the velocity compensation command on the basis of the first and second data tables.

There is also a servo drive section for making velocity compensation on the basis of the position command and the velocity compensation command from the motion command section.

Another form of the cam control apparatus comprises a motion command section having three data tables for a position command, a velocity compensation command and a current compensation command. The apparatus calculates and outputs the position command equivalent to a cam stroke in the cam mechanism, the velocity compensation command and the current compensation command in accordance with the data tables.

This second form also comprises a servo drive section for controlling the servo motor on the basis of the position command from said motion command section, said servo control section making at least one of velocity compensation based on the velocity compensation command and current compensation based on the current compensation command.

In the electronic cam control apparatus, the servo drive section comprises at least one of a first multiplier for multiplying the velocity compensation command inputted from the motion command section by a first constant, and a second multiplier for multiplying the current compensation command by a second constant.

Another form of the control apparatus for a servo system comprises a motion command section having a first data table for a position command to output the position command equivalent to a cam stroke in the cam mechanism and cam shaft data equivalent to a cam shaft position in the cam mechanism in accordance with the data table and a servo drive section having a second data table and a third data table for deriving a velocity compensation command and a current compensation command from the cam shaft data from the motion command section to derive a velocity compensation command and a current compensation command therefrom to make at least one of velocity compensation and current compensation in servo control processing.

In addition, a synthesis of torque fluctuation data of a mechanical load connected to a servo motor and data for operation of an electronic cam is used as data of the third data table for the current compensation command.

Also, a cam control apparatus for a servo system can comprise a motion command section having electronic cam data including, as one pair, three formulae, format and data for a position command, a velocity compensation command and a current compensation command to calculate and output the position command equivalent to a cam stroke in the cam mechanism, the velocity compensation command and the current compensation command in accordance with the electronic cam data. There is also a servo drive section for controlling the servo motor on the basis of the position command from said motion command section, said servo drive section making at least one of velocity compensation based on the velocity compensation command and current compensation based on the current compensation command.

BRIEF DESCRIPTION OF THE DRAWINGS

FIG. 9 is a flowchart illustrating the processing of a servo drive section according to the second embodiment of the present invention.

FIG. 11 is a current compensation data table according to the third embodiment of the present invention.

DESCRIPTION OF THE PREFERRED EMBODIMENTS

Figure 1:
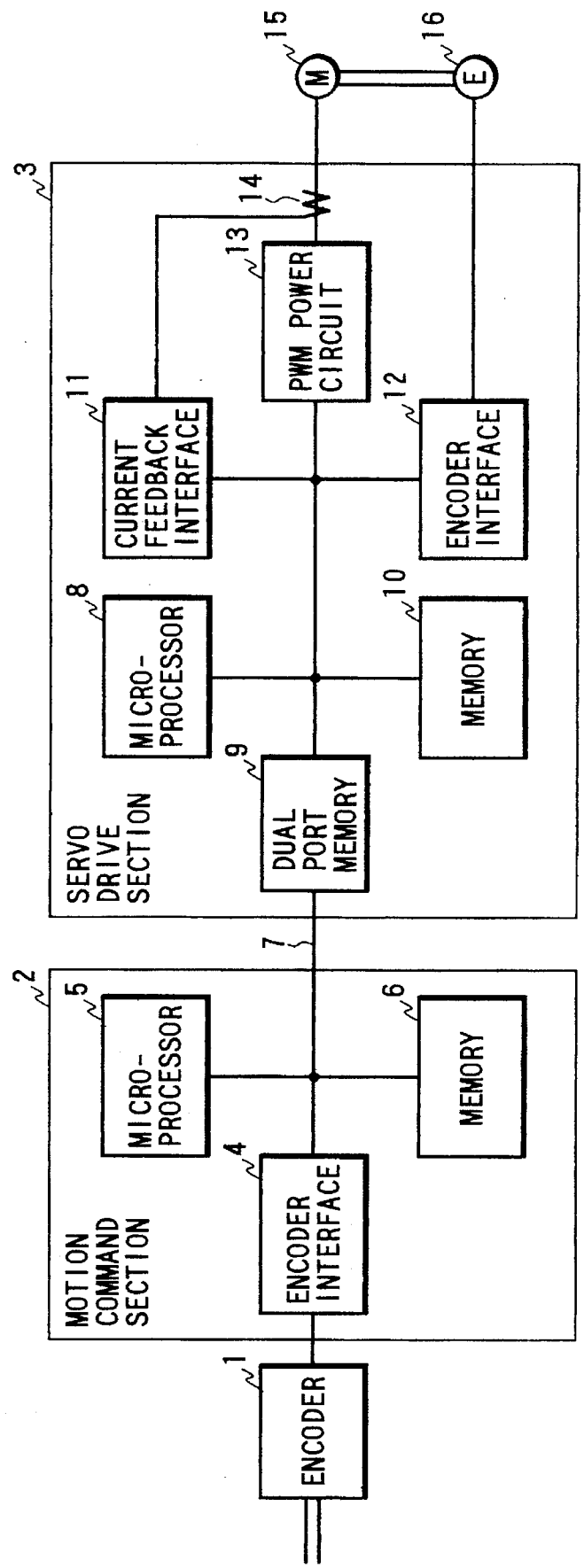
FIG. 1 is a hardware configuration diagram of a servo system according to a first embodiment of the present invention.

Turning to FIG. 1, a structural block diagram shows, in a hardware fashion, a control apparatus for a servo o system which controls an electronic cam control in accordance with the invention. An encoder 1 detects the current position of a cam shaft for electronic cam control. A motion command section 2 includes an encoder interface section 4 which converts a signal from the encoder 1 into a signal usable by the motion command section 2, a microprocessor 5 for controlling the motion command section 2, and a memory 6 for storing data and programs of the microprocessor 5. A signal line 7 exchanges data between the motion command section 2 and a servo drive section 3.

The servo drive section 3 includes a microprocessor 8 for controlling the servo drive section 3, a dual port memory 9 for data exchange between the microprocessor 5 of the motion command section 2 and the microprocessor 8 of the servo drive section 3 and a memory 10 for storing data and programs of the microprocessor 8 of the servo drive section 3. A current feedback interface 11 converts current detected by a current sensor 14 into a form usable by the microprocessor 8. An encoder interface 12 detects a signal from the encoder 16 connected to a motor 15 to be controlled. The servo drive section 3 also includes a PWM power circuit section 13 for driving the motor 15 on the basis of a voltage command from the microprocessor 8 and a current sensor 14 for detecting current flowing in the motor 15 to be controlled. The motor 15 to be controlled and an encoder 16 (for detecting the position of the motor) is connected to the servo drive section 3.

Figure 2:
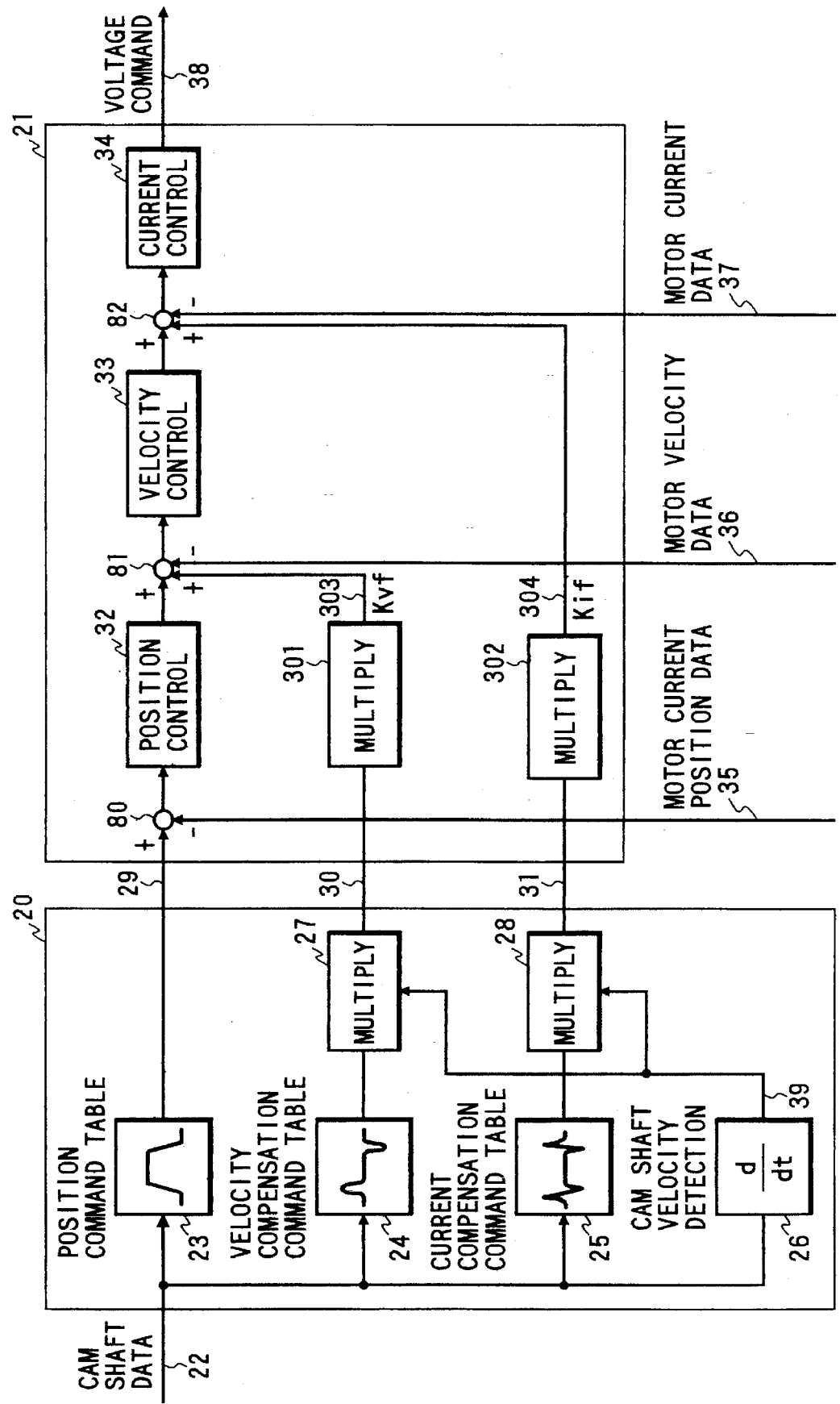
FIG. 2 is a functional block diagram according to the first embodiment of the present invention.

FIG. 2 is a functional block diagram showing the first embodiment of the invention, and the concept of the processing of the control apparatus of FIG. 1. A first block 20 represents the processing of the motion command section 2. A second block 21 represents the processing concept of the servo drive section 3. Cam shaft data 22 representing rotary angle data within one revolution of the cam shaft is found in the same way as in the conventional example and is input to the first block 20. The first block 20 includes a position command table 23 which is stored in the memory 6 in FIG. 1 with the contents shown in FIG. 16 as the conventional example, a velocity compensation command table 24, which will be described with reference to FIG. 3, found in a later described procedure and also stored in the memory 6, a current compensation command table 25, which will be described with reference to FIG. 4, found in a later described procedure and a cam shaft velocity detector 26 for detecting the rotary velocity of the cam shaft. Cam shaft rotary velocity information 39 is provided by the cam shaft velocity detector 26, multiplier 27 multiplies a later described velocity compensation command reference value calculated from the velocity compensation table 24 by a ratio of cam shaft rotary velocity. Multiplier 28 multiplies a later described current compensation command reference value calculated from the current compensation table 25 by a ratio of cam shaft rotary velocity. A calculated position command 29, a calculated velocity compensation command 30, and a calculated current compensation command 31 are all output by the motion command section 20.

Also, in the second block 21 showing the concept of the processing of the servo drive section, a position control processor 32, a velocity control processor 33 and a current control processor 34 are all provided. Motor current position value 35 of the motor detected by the encoder 16 connected to the motor 15 to be controlled, velocity information 36 of the motor detected by the encoder connected to the motor 15 to be controlled and motor current 37 of the motor 15 detected by the current feedback interface 11 are all provided in the servo drive section 21. A voltage command 38 is directed from the servo drive section 21 to the PWM power circuit 13.

Also, a multiplier 301 for multiplying a velocity compensation command 30 calculated by the motion command section 20 by a set constant, velocity compensation command gain Kvf and multiplier 302 for multiplying a current compensation command 31 calculated by the motion command section 20 by a set constant, current compensation command gain Kif are provided. A velocity compensation value 303 is obtained by multiplying the current compensation command 30 from the motion command section 20 by the velocity compensation gain Kvf. A current compensation value 304 is obtained by multiplying the current compensation command 31 from the motion command section 20 by the current compensation gain Kif.

An arithmetic processor 81 receives the velocity compensation command value 303, subtracts the velocity information 36 of the motor and adds the velocity command calculated by the position control processor 32. An arithmetic processor 82 receives the current compensation value 304, subtracts the current information 37 of the motor and adds the current command calculated by the velocity control processor 33.

Since the cam operation is repeated, not only the stroke but also the travel velocity of the motor and torque generated by the motor (i.e., motor current) can be set relative to a given position of the cam shaft. In the first embodiment, the travel velocity of the motor and torque generated by the motor (i.e., motor current) in addition to the stroke in the position command table shown in FIG. 16 are set.

When the rotation of the cam shaft at a given velocity (e.g., 100 rps) is to be referenced, the motor velocity can be calculated by the differentiation of the cam stroke position. Then, motor acceleration can be calculated by the differentiation of the motor velocity.

Here, since the product of motor acceleration and motor drive inertia is acceleration/deceleration torque and motor torque is proportional to a motor current, the motor current can be found.

Figure 16:
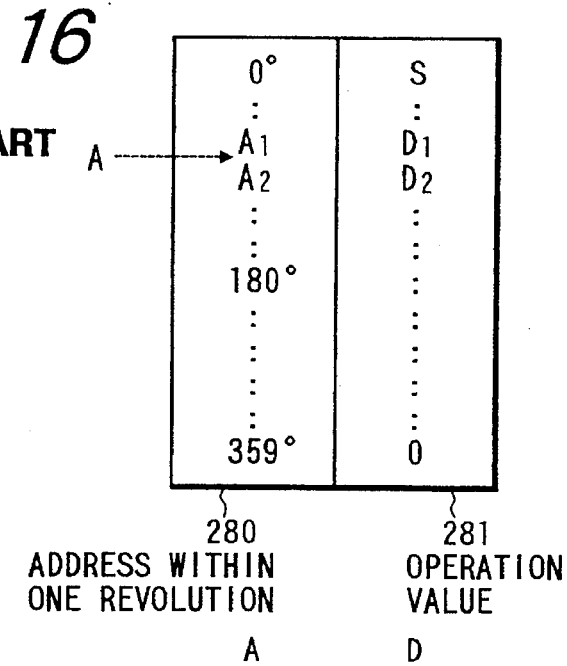
FIG. 16 is a cam shape data table (position command table) of the conventional electronic cam apparatus.
Figure 17:
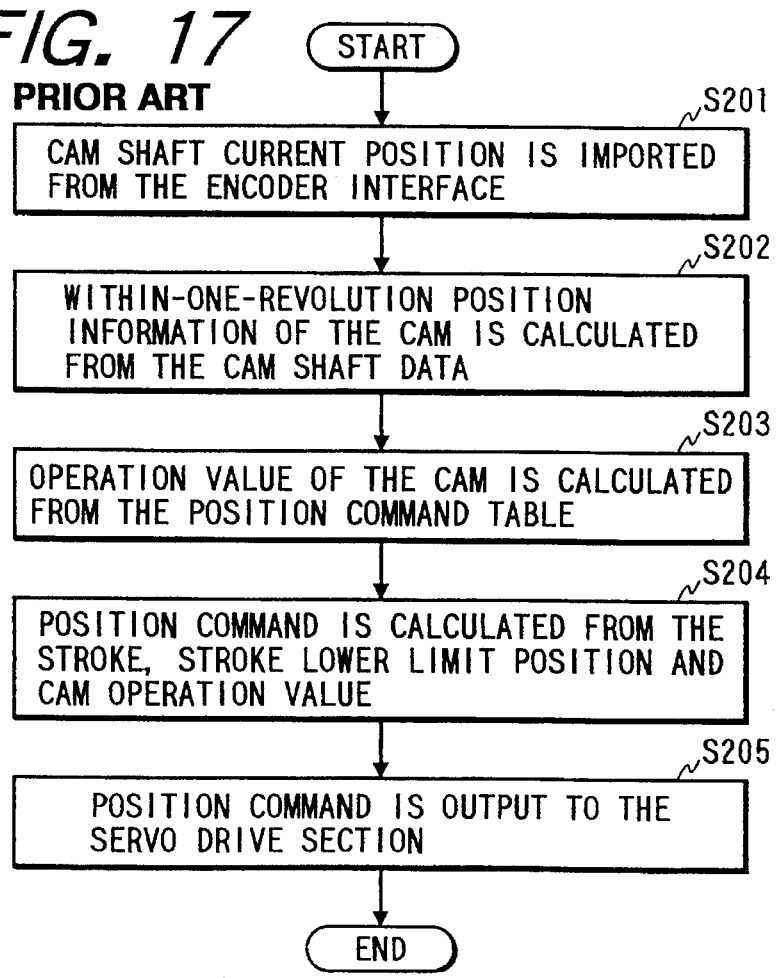
FIG. 17 is a flowchart illustrating the processing of a motion command section in the conventional electronic cam apparatus.

That is, it is assumed that the cam stroke data in the cam shaft data $A_m$ and $A_{m+1}$ are $D_m$ and $D_m+1$ at addresses within one revolution of the cam shaft as shown in FIG. 16. Then, the motor velocity $V_m$ and the motor current $I_m$ in the cam shaft data $A_m$ are obtained as follows:

$$V_m=(D_{m+1}-D_m)/\Delta t,$$

$$I_m=\alpha(D_{m+1}-D_m)/\Delta t^2$$

where, if $\Delta t$ is a unit time, the revolution velocity of the cam shaft is 100 rps, the points of cam shaft data and cam stroke data are n+1, $\Delta t=0.01/n$ is satisfied. A constant $\alpha$ is determined by the mechanical system.

Figure 3:
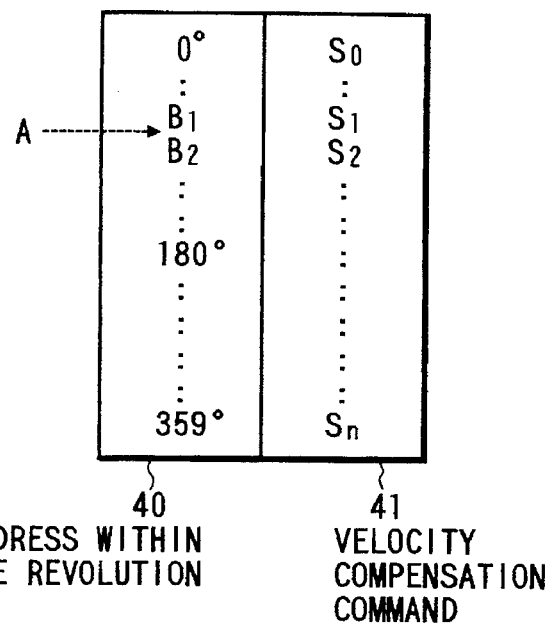
FIG. 3 is a velocity compensation data table according to the first embodiment of the present invention.
Figure 4:
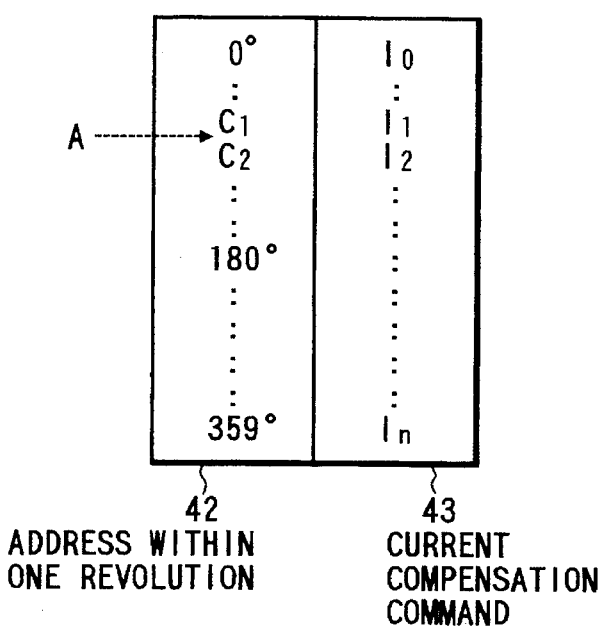
FIG. 4 is a current compensation data table according to the first embodiment of the present invention.

A velocity compensation command table 24, cam shaft position data related to velocity data, according to the first embodiment of the invention is shown in FIG. 3. Cam shaft position data related to current compensation command data, i.e., a current compensation command table 25 according to the first embodiment of the invention is shown in FIG. 4.

The velocity compensation command table 24 and the current compensation command table 25 are data tables in the case where the cam shaft rotates at a certain velocity (i.e., 100 rps).

In the foregoing example, the division points of the position command table 23, the velocity compensation command table 24 and the current compensation command table 25 are the same, however, the division points of the respective tables may not be the same.

The velocity compensation command table 24 of FIG. 3 is a memory map showing how the velocity compensation command table is stored in the memory 6, wherein addresses 40 within one revolution of the cam shaft and motor velocity compensation commands 41 correspond to said addresses 40.

Similarly, the current compensation command table of FIG. 4 is a memory map showing how the current compensation command table 25 is stored in the memory 6, wherein addresses 42 within one revolution of the cam shaft and motor current compensation commands 43 correspond to said addresses.

Figure 5:
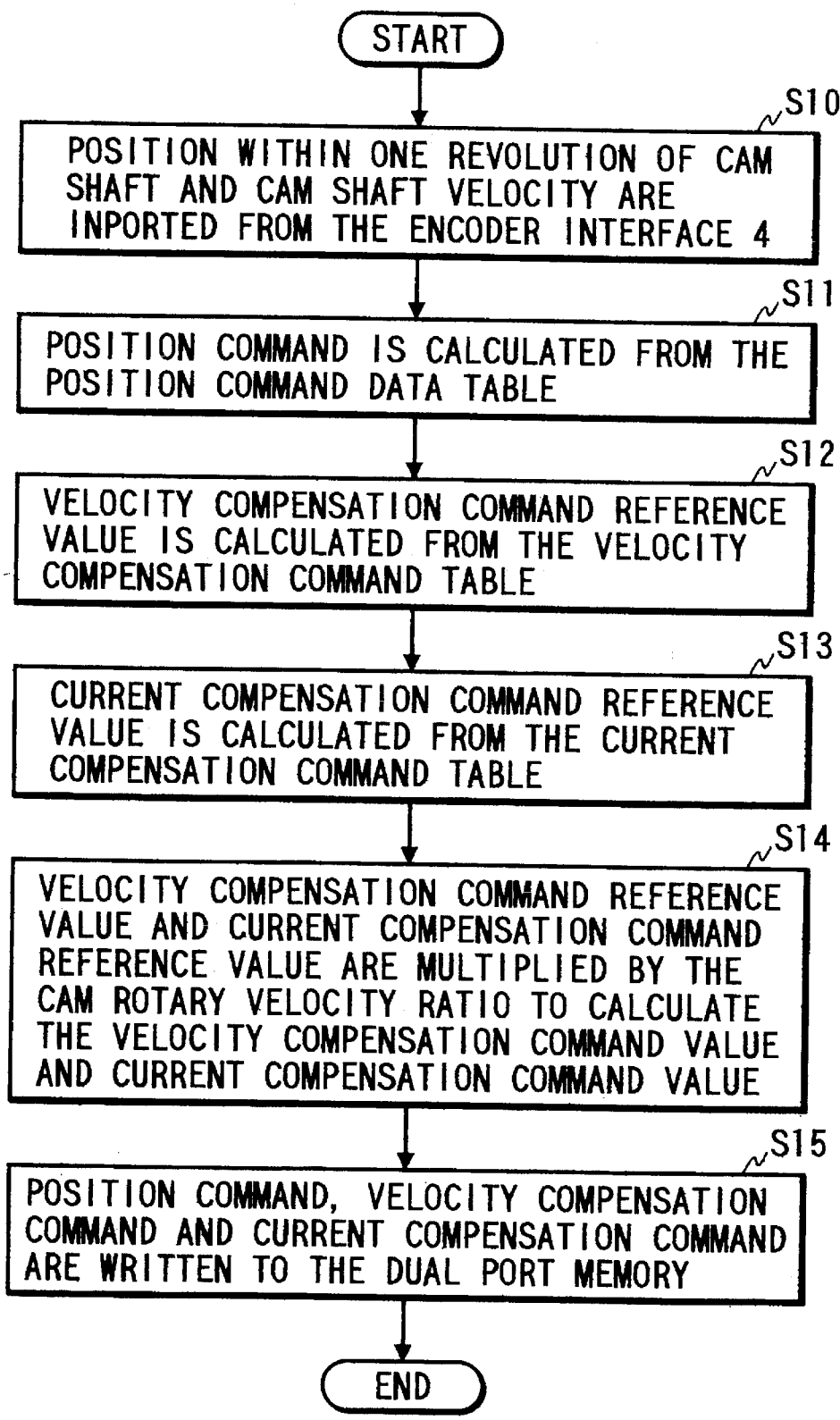
FIG. 5 is a flowchart illustrating the processing of a motion command section according to the first embodiment of the present invention.

A flowchart, as shown in FIG. 5, shows the processing procedure of the motion command section 20 according to the first embodiment of the invention. Hereinafter, the processing of the motion command section 20 according to the first embodiment will be described.

First, the microprocessor 5 in the motion command section 2 receives the cam shaft data 22 indicating rotary position A within one revolution of the cam shaft from the encoder interface 4 as in the conventional example and the rotary velocity information 39 of the cam shaft from the detection means 26 in step S10.

As in the conventional example, the microprocessor 5 calculates the position command 29 in the rotary position A within one revolution of the cam shaft from the position command data table 23 in step S11.

Figure 18:
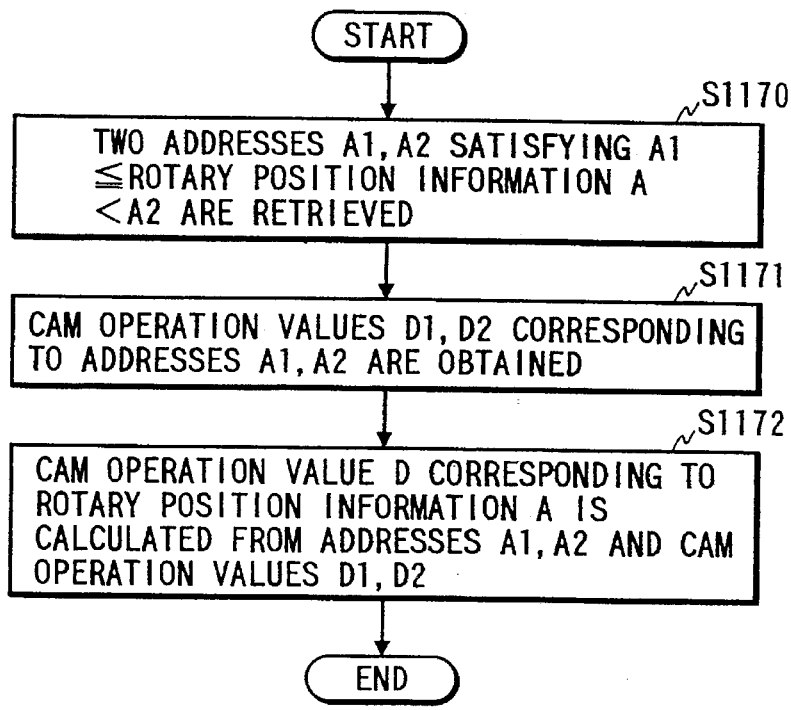
FIG. 18 is a flowchart illustrating the processing of the motion command section in the conventional electronic cam apparatus.

Then, in the same procedure as shown in FIG. 18, the velocity compensation command reference value S and the current compensation command reference value I are found as described below.

In step S12, the microprocessor 5 finds B1 and B2 closest to A among position addresses 40 within one revolution of the cam shaft satisfying B1 $\leq$A<B2 from the velocity compensation command table 24. The velocity compensation command values 41 of the velocity compensation command table corresponding to B1 and B2 within one revolution of the cam shaft are obtained from the velocity compensation command table 24 and defined as S1 and S2. As in finding the cam operation value, the velocity compensation command reference value S corresponding to the cam shaft rotary position information A is found by the following expression which makes a proportional distribution calculation:

$$S=S1+(S2-S1)\times\{(A-B1)(B2-B1)\}$$

In step S13, the microprocessor 5 finds C1 and C2 closest to A among position addresses within one revolution of the cam shaft satisfying C1 $\leq$A<C2 from the current compensation command table 25. The current compensation command 43 values of the current compensation command table 25 corresponding to C1 and C2 within one revolution of the cam shaft are obtained from the current compensation command table 25 and defined as I1 and I2. As in finding the cam operation value, the current compensation command reference value I corresponding to the cam shaft rotary position information A is found by the following expression which makes a proportional distribution calculation:

$$I=I1+(I2-I1)\times\{(A-C1)(C2-C1\}$$

Next, the velocity compensation command value 30 and the current compensation command value 31 are calculated in step S14. Here, the velocity compensation command reference value S and current compensation command reference value I assume that the cam shaft is rotating at 100 rps, for example. The velocity $\omega$ of the cam shaft is detected by the cam shaft velocity detector 26 in FIG. 2, which performs time differentiation on the position data of the cam shaft data 22. The velocity compensation command value 30 at position address A within one revolution of the cam shaft rotating at the velocity $\omega$ is found by the multiplier 27 using the following expression:

$$S'=S\times\omega/100$$

and the current compensation command value 31 is found by the multiplier 28 using the following expression:

$$I'=I\times\omega/100$$

In step S15, the motion command section 20 outputs the position command 29, velocity compensation command value 30 and current compensation command value 31 of the motor to the servo drive section 21, and writes the position command 29, velocity compensation command value 30 and current compensation command value 31 of the motor to the dual port memory 9 of the servo drive section 3 shown in FIG. 1.

Here, the above description shows an example where the position command 29, velocity compensation command value 30 and current compensation command value 31 of the motor at the position address A within one revolution of the cam shaft are obtained by the proportional distribution calculation, but they need not always be found by the proportional distribution calculation but may be found by interpolation using a spline curve, for example.

Processing procedures of the microprocessor 8 in the servo drive section 3 will now be described.

Figure 6:
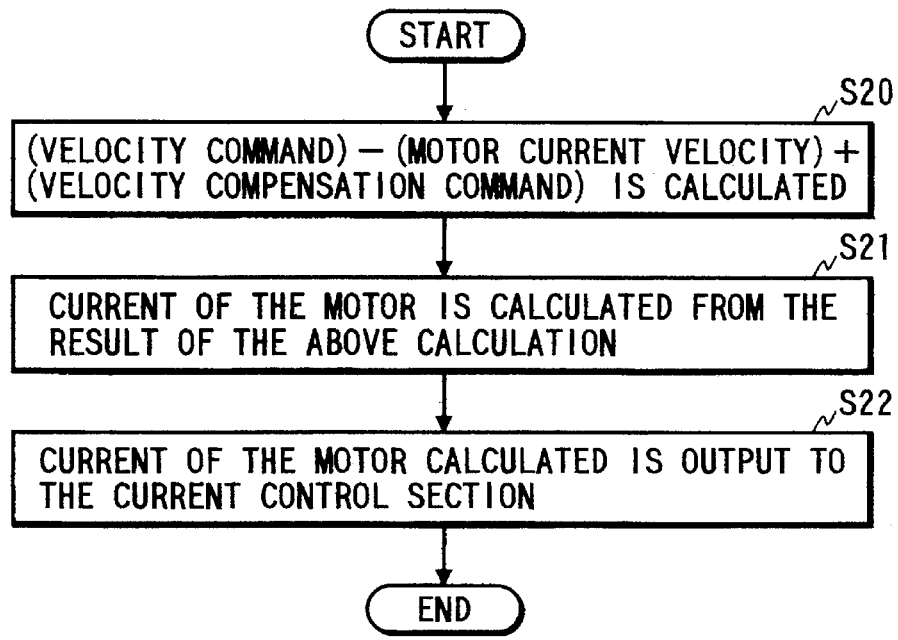
FIG. 6 is a flowchart illustrating the velocity control processing of a servo drive section according to the first embodiment of the present invention.
Figure 7:
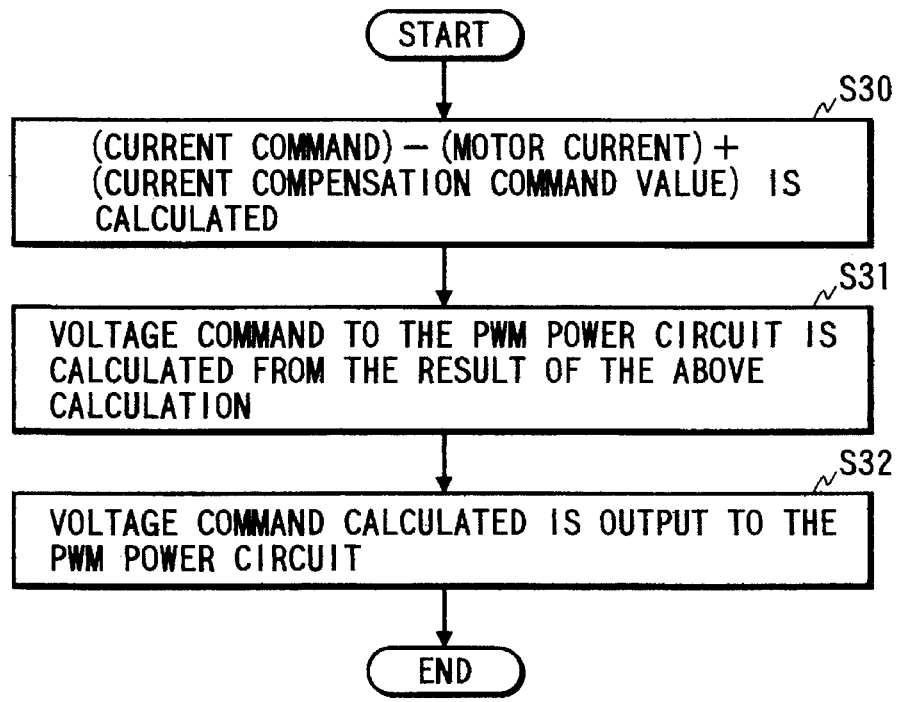
FIG. 7 is a flowchart illustrating the current control processing of the servo drive section according to the first embodiment of the present invention.
Figure 19:
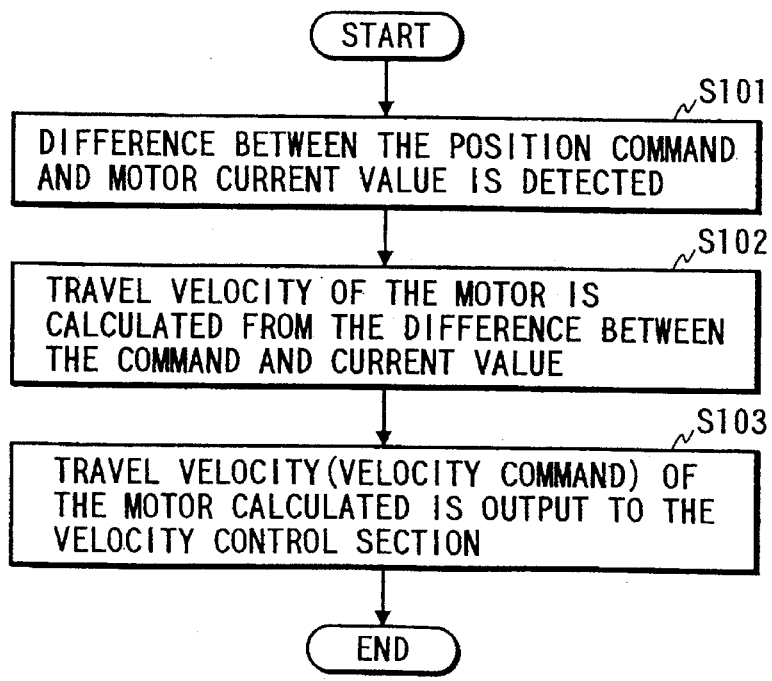
FIG. 19 is a flowchart illustrating the position control processing of a servo drive section in the conventional electronic cam apparatus.
Figure 20:
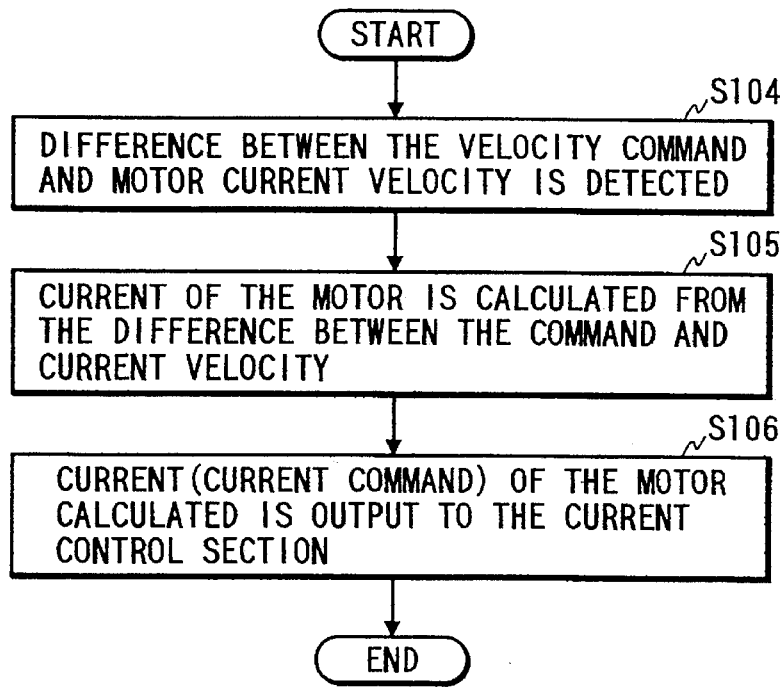
FIG. 20 is a flowchart illustrating the velocity control processing of the servo drive section in the conventional electronic cam apparatus.
Figure 21:
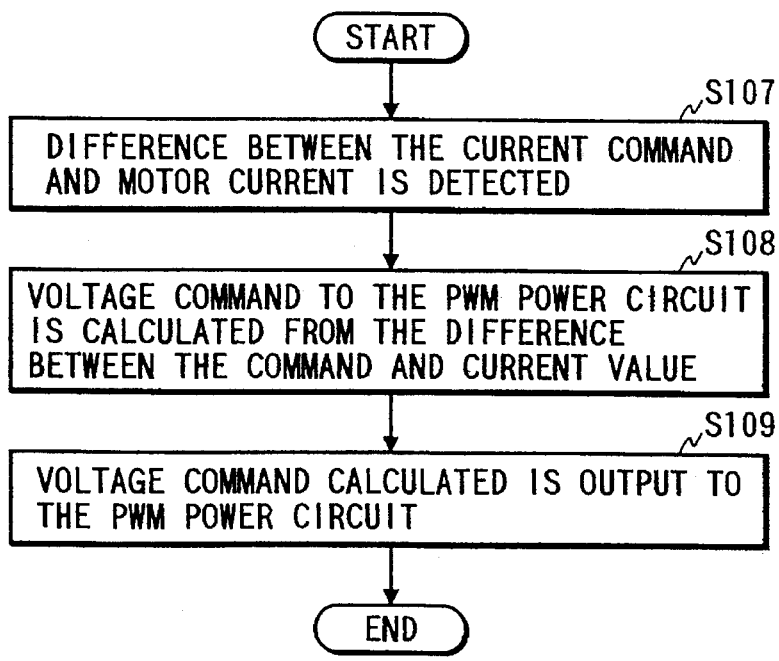
FIG. 21 is a flowchart illustrating the current control processing of the servo drive section in the conventional electronic cam apparatus.

FIGS. 6 and 7 are flowcharts showing the processing of the velocity control processor 33 and the current control processor 34 in the block 21 showing the processing concept of the servo drive section of FIG. 2. The description of the position control processor 32 will be omitted here because it has been made with reference to FIG. 19 as the conventional example.

The position control processor 32 calculates a travel velocity of the motor according to a difference between the position command 29 of the motor given by the motion command section 20 and the motor position information 35 and outputs a velocity command to the velocity control processor 33.

The processing of the velocity control processor 33 will be described with reference to the flowchart in FIG. 6.

In step S20, a difference between the velocity command outputted by the position control processor 32 and the motor velocity 36 detected by the encoder interface is determined. This difference is added to a velocity compensation command value 30 outputted by the motion command section 20.

In step S21, a current value given to the motor is calculated from the output of step S20.

In step S22, the current command is outputted to the current control processor 34.

The processing of the current control processor 34 will be described with reference to the flowchart in FIG. 7.

In step S30, a difference between the current command calculated by the velocity control processor 33 and the motor current 37 detected by the current feedback section is determined. This difference is added to the current compensation command 31 value output from the motion command section 20.

In step S31, a voltage command 38 given to the motor is calculated from the output of step S30.

In step S32, the voltage command 38 is outputted to the PWM power circuit 13. The PWM power circuit 13 outputs the current to the motor under the control of the voltage command 38.

As described above, the control apparatus for the servo system for electronic cam control according to the invention can find not only the stroke of the motor which performs cam operation according to the rotary angle of the cam shaft but also the motor velocity and torque (motor current) according to the rotary angle and rotary velocity of the cam shaft, whereby compensations can be made in velocity control and current control by feed forward control with optimum values for cam operation. Hence, the response of the motor to sudden changes in the position command can be improved, and if the velocity of the cam shaft is increased and the delay in the response of the motor to the command is conspicuous, cam operation of the motor closer to the cam pattern can be achieved as compared to a case where the compensations are not made.

The above description shows an example where the arithmetic processor 81 of the velocity control processor 33 executes the addition of the velocity compensation command 30 and the subtraction of the motor velocity information 36 with respect to the velocity command calculated by the position control processor 32. It is also an example of the addition of the current compensation command 31 and the subtraction of the current information 37 with respect to the current command calculated by the velocity control processor 33. The velocity compensation value 303 obtained by multiplying the velocity compensation command 30 with gain Kvf through the multiplier 301, and the current compensation value 304 obtained by multiplying the current compensation command 31 with gain Kif through the multiplier 302 may be used instead of the velocity compensation command 30 and the current compensation command 31, respectively, thereby being capable of changing the effect of the velocity compensation and the current compensation.

Figure 8:
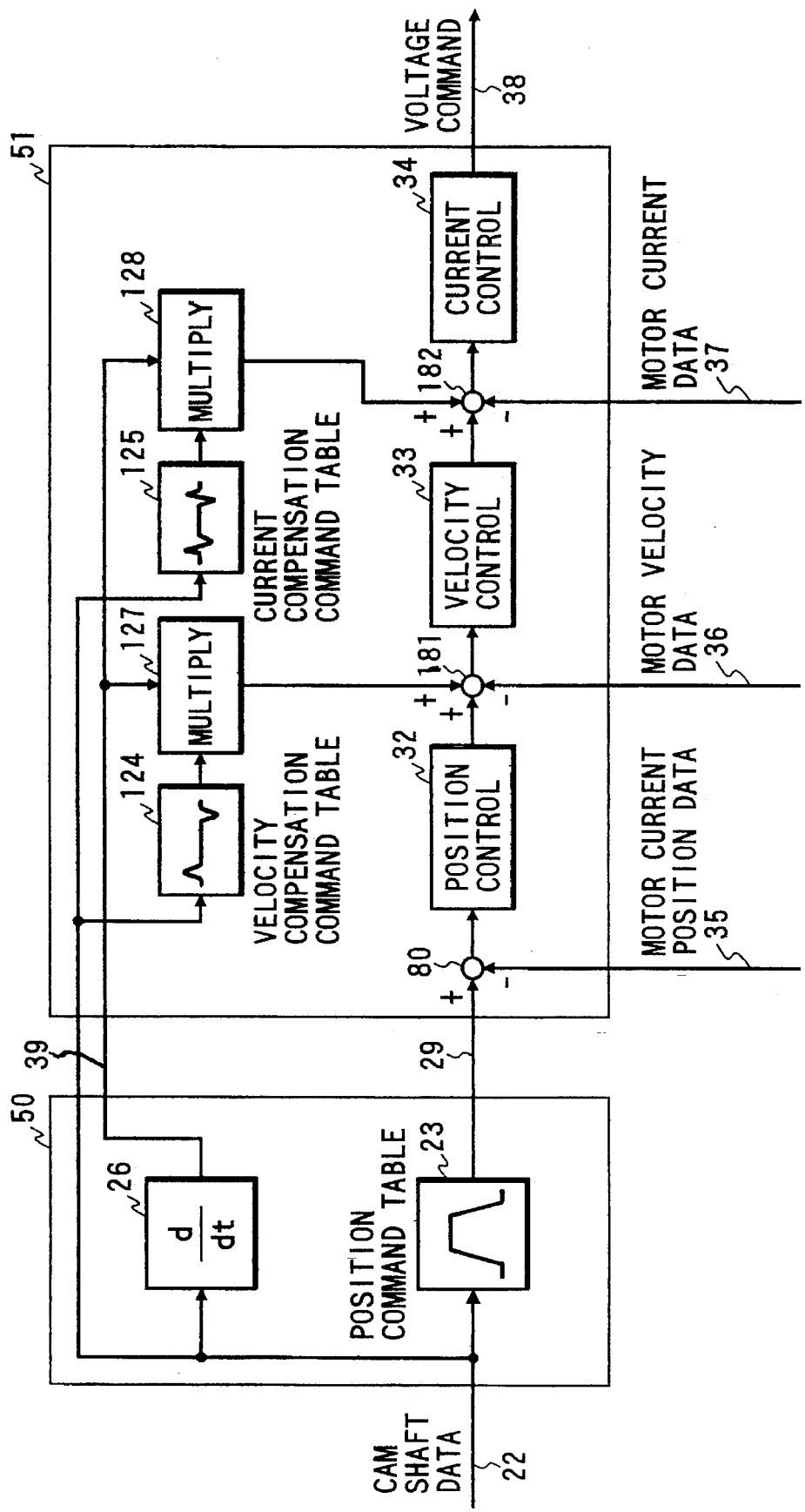
FIG. 8 is a functional block diagram according to a second embodiment of the present invention.

A functional block diagram of a second embodiment of the present invention and an associated processing concept of the control apparatus of FIG. 1 is shown in FIG. 8. A block 50 is generally representative of the processing of the motion command section is connected to a second block 51 which is representative of the processing of the servo drive section. Cam shaft data 22 representative of rotary angle data within one revolution of the cam shaft is input to the motion command section 50. A position command table 23 is stored in the memory 6 of FIG. 1 with the contents as shown in FIG. 16. A calculated position command 29 is output from the motion command section 50 to the servo drive section 51. Cam shaft velocity detector 26 detects the rotation velocity of the cam shaft and obtains cam shaft rotation velocity information 39. A velocity compensation command table 124 (which will be described later with reference to FIG. 3) is stored in the memory 10 within the servo drive section 3 of FIG. 1. A current compensation command table 125 (which will be described later with reference to FIG. 4) is stored in the memory 10 within the servo drive section 3 of FIG. 1.

Multiplier 127 multiplies a velocity compensation command reference value calculated by the velocity compensation command table 124 by a ratio of the cam shaft rotation velocity 39. Multiplier 128 multiplies a current compensation command reference value calculated by the current compensation command table 125 by a ratio of the cam shaft rotation velocity 39. A position control processor 32, a velocity control processor 33 and a current control processor 34 are provided in the servo drive section 51. Current position information 35 of the motor detected by the encoder 16 connected to the motor to be controlled, motor velocity information 36 detected by the encoder 16 connected to the motor 15 to be controlled and a motor current 37 detected by the current feedback interface 11 within the servo drive section are input to the servo drive section 51. A voltage command 38 is outputted to the PWM power circuit section 13.

An arithmetic processor 181 receives the output of the multiplier 127, subtracts the motor velocity information 36 and adds a velocity command calculated by the position control processor 32. An arithmetic processor 182 receives the output of the multiplier 128, subtracts the motor current information 37 and adds a current command calculated by the velocity control processor 33.

In the description of the first embodiment, the velocity compensation command table 24 and the current command compensation table 25 were stored in the memory 6 of motion command section 2, seen in FIG. 1. In the second embodiment, they are stored in the memory 10 within the servo drive section 3 of FIG. 1.

In FIG. 8, parts represented by numerals identical to those in the conventional example and other embodiments designate identical or corresponding functions.

Functional operations shown in FIG. 8 will now be described. As in the conventional example and the first embodiment, the position command table 23, the velocity compensation command table 124 and the current compensation command table 125 are created first. Here, the velocity compensation command table 124 and current compensation command table 125 assume that the cam shaft is rotated at a given velocity (e.g., 100 rps).

First, the processing of the motion command section 50 will be described. The microprocessor 5 in the motion command section 2 writes to the dual port memory 9 in the servo drive section 3. The position command 29 and the cam shaft data 22 are calculated in the same procedure as in the conventional example. The cam shaft data 22 within one revolution of the cam shaft is obtained by the encoder interface 4 in FIG. 1, and the velocity 39 of the cam shaft is obtained by time-differentiating the current position of the cam shaft by the cam shaft velocity detector 26.

Looking to FIG. 9, a flowchart represents the processing of the servo drive section according to the second embodiment of the invention. The processing procedure of the microprocessor 8 in the servo drive section 3 will now be described.

In step S40, cam shaft data 22, cam shaft rotation velocity 39 and a position command value are taken from the dual port memory 9.

In step S41, as in the calculation processing of the velocity compensation command value and current compensation command value in the motion processor in the first embodiment, the microprocessor 8 in the servo drive section calculates the velocity compensation command value and current compensation command value with respect to the cam shaft data 22.

It is assumed that A is the value of the cam shaft data 22. First, B1 and B2 closest to A among position addresses within one revolution of the cam shaft satisfying B1 and B2 are retrieved from the velocity compensation command table 124. Then, velocity compensation command values 41 corresponding to the position addresses B1 and B2 within one revolution of the cam shaft are obtained from the velocity compensation command table 124 and defined as S1 and S2.

As in finding the cam operation value, the velocity compensation command reference value S corresponding to the cam shaft rotary position information A is found by the following expression which makes a proportional distribution calculation:

$$S=S1+(S2-S1)\times\{(A-B1)/(B2-B1)\}$$

Similarly, C1 and C2 closest to A among position addresses within one revolution of the cam shaft satisfying $C1 \leq A < C2$ are found from the current compensation command table 125. Current compensation command values 43 corresponding to the position addresses C1 and C2 within one revolution of the cam shaft are obtained from the current compensation command table and defined as I1 and I2.

As in finding the cam operation value, the current compensation command reference value I corresponding to the cam shaft rotary position information A is found by the following expression which makes a proportional distribution calculation:

$$I=I1+(I2-I1)\times\{(A-C1)/(C2-C1)\}$$

Here, the velocity compensation command reference value S and current compensation command reference value I assume that the cam shaft is rotating at 100 rps, for example. Therefore, when it is supposed that the rotary velocity of the cam shaft imported from the dual port memory is ω, the velocity compensation command value at the position address A within one revolution of the cam shaft rotating at the velocity of ω is found by the multiplier 127 using the following expression:

$$S'=S\times\omega/100$$

and the current compensation command value is found by the multiplier 128 using the following expression (S41):

$$I'=I\times\omega/100$$

Here, the velocity compensation command value S' and current compensation command value I' at the position address A within one revolution of the cam shaft need not always be found by the proportional distribution calculation but may be found by interpolation using spline curve, for example.

Subsequently, after calculating the above data, the microprocessor 8 in the servo drive section 3 calculates the voltage command 38 to be output to the PWM power circuit in the procedure shown in FIGS. 7 and 8 and in step S42 as in the first embodiment.

In a system where one motion command section gives position commands to several servo drive sections and several motors perform independent cam operations in synchronization with one encoder, the processor 5 of the motion command section 2 is burdened in the first embodiment because the motion command section 2 needs to calculate the velocity compensation commands and current compensation commands for all motors. Each servo drive section in the second embodiment, on the other hand, has the velocity compensation command table 124 and current compensation command table 125, from each of which the microprocessor 8 in each servo drive section 3 calculates the velocity compensation value 41 and current compensation value 43 according to the cam shaft rotary angle, whereby parallel processing can be performed on a system basis to improve the performance of the whole system.

Figure 10:
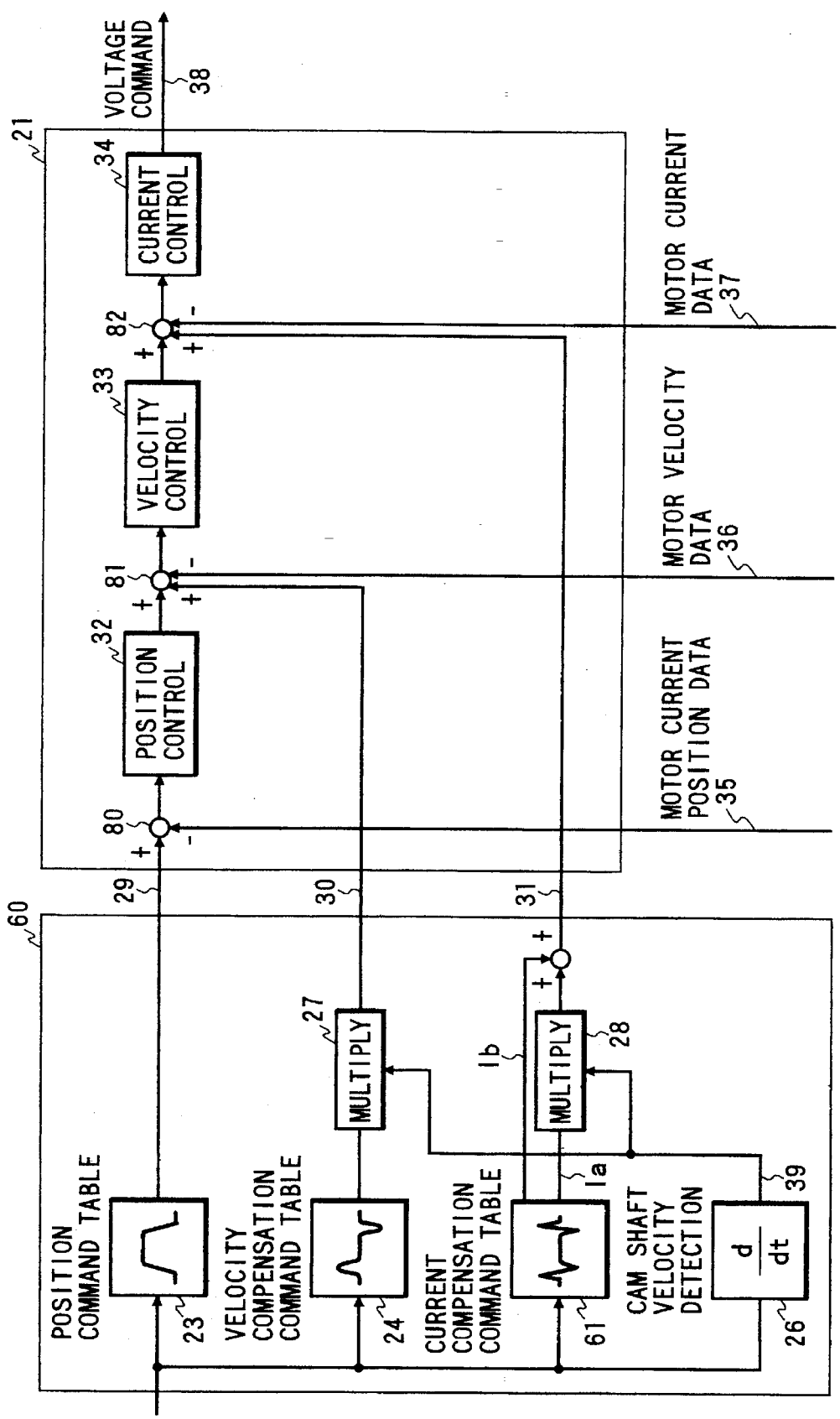
FIG. 10 is a functional block diagram according to a third embodiment of the present invention.

A control apparatus for a servo system performing electronic cam control in accordance with a third embodiment of the present invention is shown in FIG. 10. The hardware configuration as shown in FIG. 1 will be described by way of example.

In FIG. 10, reference numerals identical to those in the conventional example and other embodiments designate identical or corresponding functions. As seen in FIG. 10, the motion command section 60 performs the processing of the third embodiment and includes a current compensation command table 61 created in a procedure that will be described later.

First, as in the conventional example and the first embodiment, the position command table 23 and velocity compensation command table 24 as shown in FIGS. 16 and 3, respectively, are determined on the basis of the required cam operation. Here, since the cam operation is repeated and a torque applied to a load (that is, a load torque applied to the motor as a reaction from the load) and frictional torque according to the inertia of the machine and the rotary angle of the cam shaft can be obtained once a mechanical system to be controlled is determined, not only the stroke and the travel velocity of the motor but also torque generated by the motor connected to the mechanical system to be controlled (i.e., motor current) can be set relative to a given position of the cam shaft. Namely, when the rotation of the cam shaft at a given velocity (e.g., 100 rps) is to be referenced from, the motor-generated torque can be represented by the sum of inertia acceleration/deceleration torque, load torque Tl and frictional torque Tf.

Here, motor acceleration is calculated by the differentiation of the motor velocity, and the product of motor acceleration and inertia is the acceleration/deceleration torque. The motor velocity depends on the velocity of the cam shaft and therefore the acceleration/deceleration torque depends on the velocity of the cam shaft, but the load torque and frictional torque are independent of the motor velocity.

That is, because the load torque is a force to be applied to a load, it is determined in accordance with required operation. If it is assumed that the mass of a movable portion for executing the cam operation by a motor friction is W and the friction coefficient between the movable portion and the stational portion is $\mu$, then the friction torque is obtained by the following expression:

$$Tf=\mu Wg (g:=\text{gravity constant})$$

Here, for example, there is a case where the mass W of the movable portion is changed according to a position of the movable portion (that is, this is represented by a rotary angle of the cam shaft) in the transportation of a workpiece, and there is a case where the friction coefficient $\mu$ is changed similarly. Hence, the friction coefficient can be represented by a parameter due to the rotary angle of the cam shaft.

Accordingly, a cam shaft data-current command data table, hereinafter referred to as the current compensation command table 61, having two parameters in correspondence with the rotary angle of the cam shaft as shown in FIG. 11 is created. The structure of the current compensation command table 61 is shown in FIG. 11. The current compensation table 61 includes addresses 62 within one revolution of the cam shaft, a first parameter 63 dependent on the rotary velocity of the cam shaft, and a second parameter 64 independent of the rotary velocity of the cam shaft. Here, the current compensation command table 61 assumes that the cam shaft is rotated at a given velocity (e.g., 100 rps).

Figure 12:
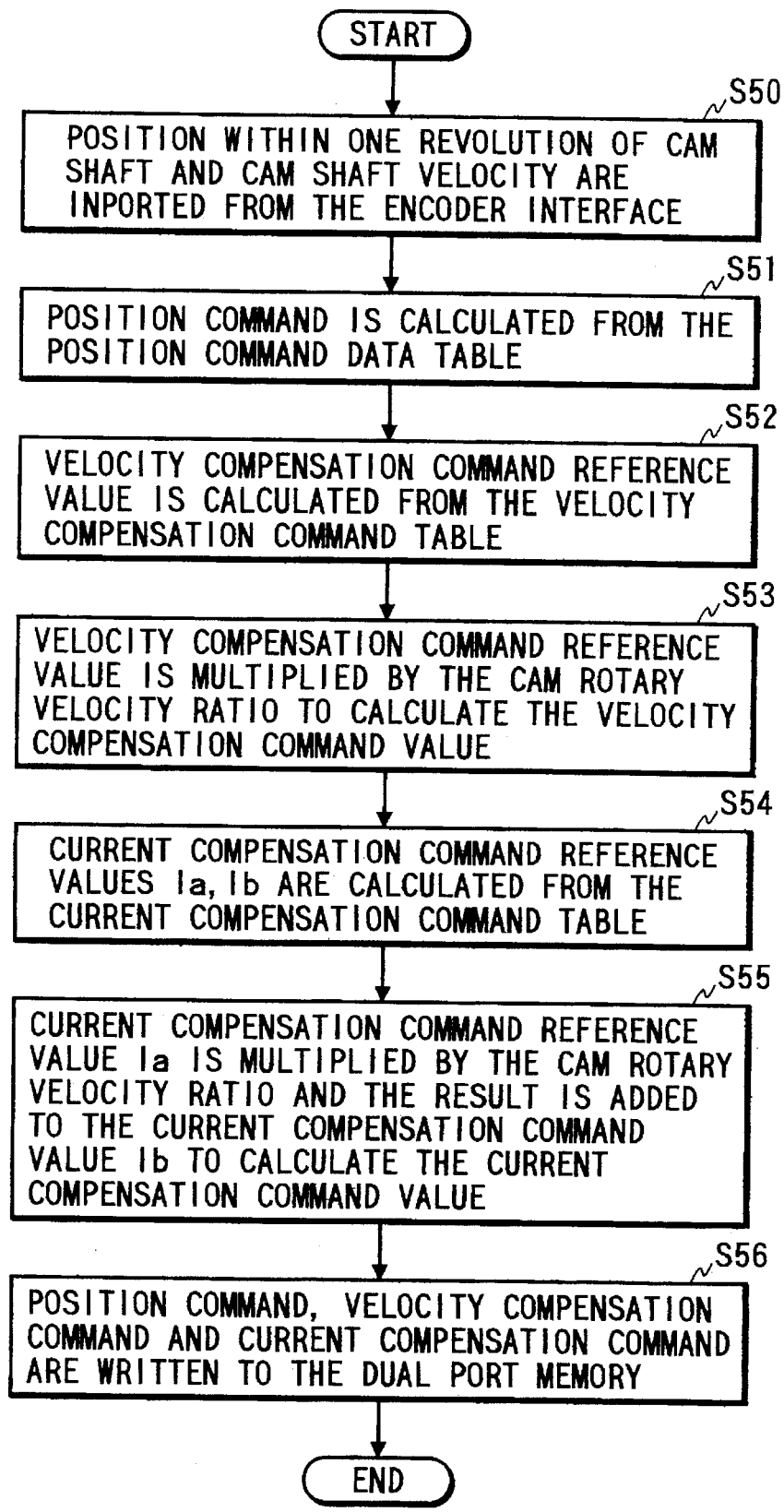
FIG. 12 is a flowchart illustrating the processing of a motion command section according to the third embodiment of the present invention.

A flowchart showing the processing procedure of the microprocessor in the motion command section according to the third embodiment is shown in FIG. 12. As in the first embodiment, the microprocessor 5 imports the cam shaft data 22 within one revolution of the cam shaft and cam shaft rotary velocity from the encoder interface 4 in step S50. The microprocessor 5 calculates the position command in step S51 as in the conventional example. Subsequently, the microprocessor 5 calculates the velocity compensation command reference value in step S52, and calculates the velocity compensation command S' in step S53 as in the first embodiment.

Then, as in the first embodiment, position addresses within one revolution of the cam shaft satisfying $C1 \leq A < C2$ are retrieved from the current compensation table 61 in step S54. The cam shaft velocity-dependent current compensation command 63 values corresponding to C1 and C2 are obtained from the current compensation command table 61 and defined as Ia1 and Ia2. As in finding the cam operation value, the current compensation command reference value Ia corresponding to the cam shaft rotary position A is found by the following expression which makes a proportional distribution calculation:

$$Ia=Ia1+(Ia2-Ia1)\times\{(A-C1)(C2-C1)\}$$

Here, in the third embodiment, a case where the items independent of the rotary velocity of the cam shaft change continuously relative to the address within one revolution of the cam shaft will be considered. Similarly, cam shaft rotary velocity-independent current compensation command 64 values Ib corresponding to the position addresses A1 and A2 within one revolution of the cam shaft are obtained from the current compensation command table 61 and defined as Ib1 and Ib2, respectively. As in finding the cam operation value, the current compensation command reference value Ib corresponding to the cam shaft rotary position information A is found by the following expression which makes a proportional distribution calculation:

$$Ib=Ib1+(Ib2-Ib1)\times\{(A-C1)/(C2-C1)\}$$

Here, the current compensation command reference value Ib assumes that the cam shaft is rotating at 100 rps, for example. Therefore, in step S55, when the rotary velocity of the cam shaft is detected by the cam shaft velocity detector 26 in FIG. 10 from the time differentiation of the cam shaft rotary angle and the rotary velocity of the cam shaft is $\omega$, the current compensation command value at the position address A within one revolution of the cam shaft rotating at the velocity $\omega$ is found using the following expression:

$$Ia'=Ia\times\omega/100$$

Accordingly, the current compensation command value I' is found as follows:

$$I'=Ia'+Ib$$

The motion command section 2 writes to the dual port memory 9 shown in FIG. 1 the cam operation value D, velocity compensation command value S' and current compensation command value I' found as described above, in step S56.

Here, the position command C, velocity compensation command value S' and current compensation command value I' at the position address A within one revolution of the cam shaft need not always be found by the proportional distribution calculation but may be found by interpolation using spline curve, for example.

Subsequently, the microprocessor 8 in the servo drive section 3 calculates the voltage command 38 to drive the motor to be controlled as in the first embodiment and the PWM power circuit drives the motor connected to the mechanical system to be controlled.

As described above, if the mechanical system to be controlled is determined, the electronic cam apparatus can calculate not only the stroke of the motor which performs cam operation according to the rotary angle of the cam shaft but also the motor velocity and motor-generated torque (motor current) according to the rotary angle and rotary velocity of the cam shaft. Compensations can be made in velocity control and current control by feed forward control with optimum values for cam operation. Also, when the mechanical system has been determined and the load torque varies during cam operation, the addition of such variations to the current compensation command table allows optimum feed forward control to be exercised relative to the variation of the load torque. Hence, if the velocity of the cam shaft is increased and the delay in the response of the motor to the command is conspicuous, the cam operation of the motor closer to the cam pattern can be achieved as compared to a case where the compensations are not made.

Also, the third embodiment, which has the velocity compensation command table 24 and current compensation command table 25 in the motion command section as in the first embodiment, may have the velocity compensation command table 24 and current compensation command table 25 in the servo drive section 3.

Also, in addition to the above-described processing example of the case where the items independent of the rotary velocity of the cam shaft change continuously relative to the rotary angle of the cam shaft, the third embodiment can handle a case where the items independent of the rotary velocity of the cam shaft change discontinuously relative to the rotary angle of the cam shaft. For example, by detecting a discontinuous point from the cam shaft rotary position information and processing the proportional distribution area in the example in the other procedure. Further, when the items independent of the rotary velocity of the cam shaft remain unchanged, a constant is added to a value calculated from the item dependent on the cam shaft rotary velocity, without the calculation of the proportional distribution being made, to find the current compensation command value, whereby processing can be simplified.

Figure 13:
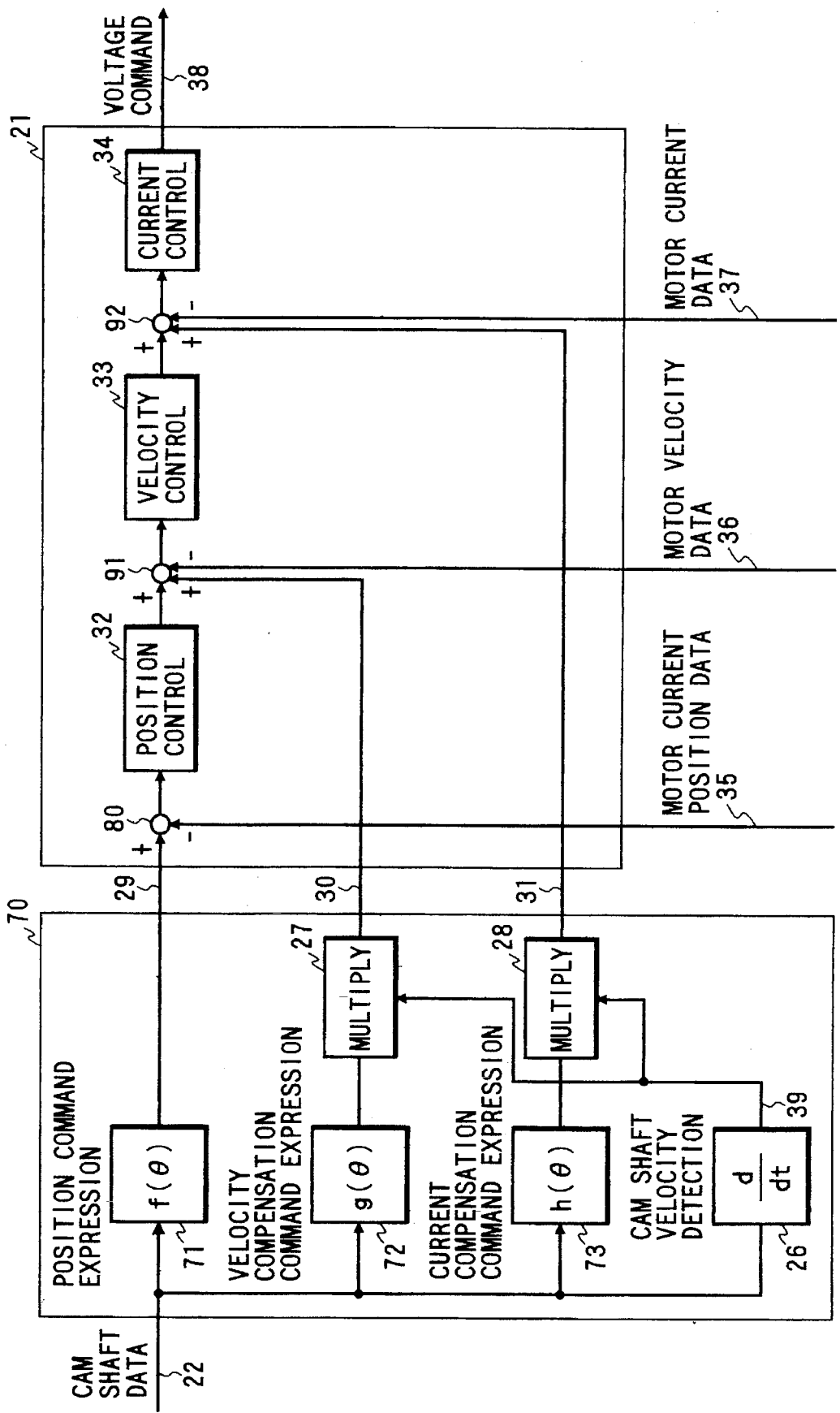
FIG. 13 is a functional block diagram according to a fourth embodiment of the present invention.

A fourth embodiment having operations as shown in FIG. 13 are performed in the electronic cam apparatus having the hardware configuration as shown in FIG. 1. FIG. 13 shows the processing concept of the electronic cam apparatus in FIG. 1. In FIG. 13, numerals identical to those in the conventional example and other embodiments designate identical or corresponding functions. A block 70 representing the processing of the motion command section 2 contains a position command expression 71 stored in the memory 6 within the motion command section 2, a velocity compensation expression 72, and a current compensation expression 73.

Operations will now be described. Here, it is supposed that the cam operation performed is of the reciprocating type. At this time, it is assumed that the reciprocating cam operation value D is represented by the following expression:

$$D=(1+\cos\theta)/2$$

($\theta$: angle within one revolution of cam shaft) Position command 29 having a value p is output from the motion command section 2 to the servo drive section 3 in response to the cam shaft data found is done in the same procedure as in the conventional example, i.e., $\theta$, is represented by the following expression:

$$p=f(\theta)=h1\times(1+\cos\theta)/2+h2 \quad (1)$$

where h1 indicates a cam stroke and h2 denotes a stroke lower limit position. At this time, a motor velocity v at the time when the cam shaft is rotating at a given velocity (e.g., 100 rps), which is represented by the differentiation of the position, is represented by the following expression:

$$v=g(\theta)=\alpha=\sin\theta \quad (2)$$

(where $\alpha$ is a constant). When the current compensation command 31 for the motor is calculated as in the first embodiment, the motor acceleration is represented by the differentiation of velocity, and therefore, the motor acceleration/deceleration torque at a time when the cam shaft is rotating at a given velocity (e.g., 100 rps), or the product of motor acceleration and inertia, is represented by the following expression:

$$=\beta\cos(\beta \text{ is a constant})$$

Since the motor torque is proportional to the motor current, the motor current is represented by the following expression:

$$i=h(\theta)=\gamma\times\cos\theta \quad (3)$$

($\gamma$ is a constant)

Figure 14:
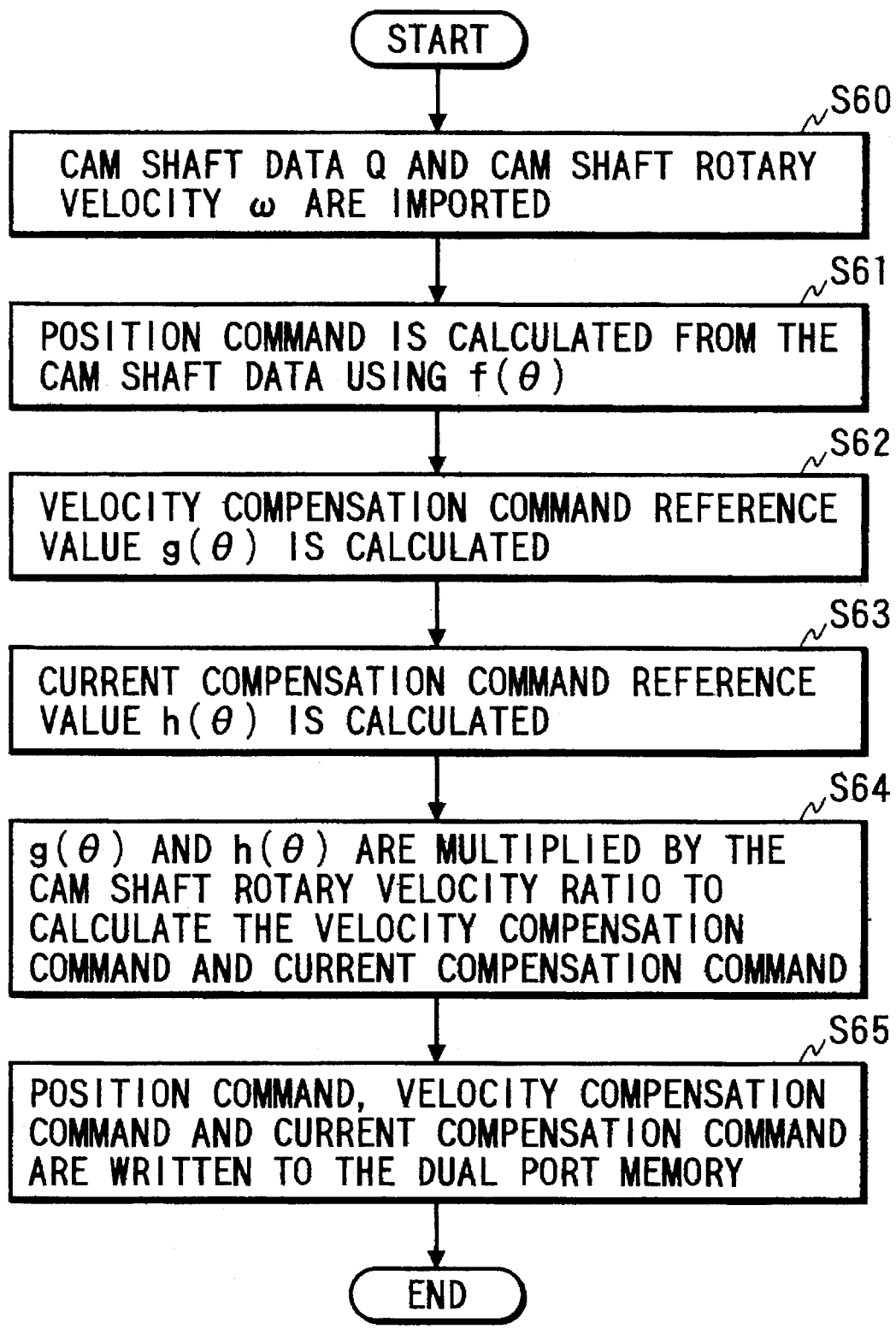
FIG. 14 is a flowchart illustrating the processing of a motion command section according to the fourth embodiment of the present invention.
Figure 15:
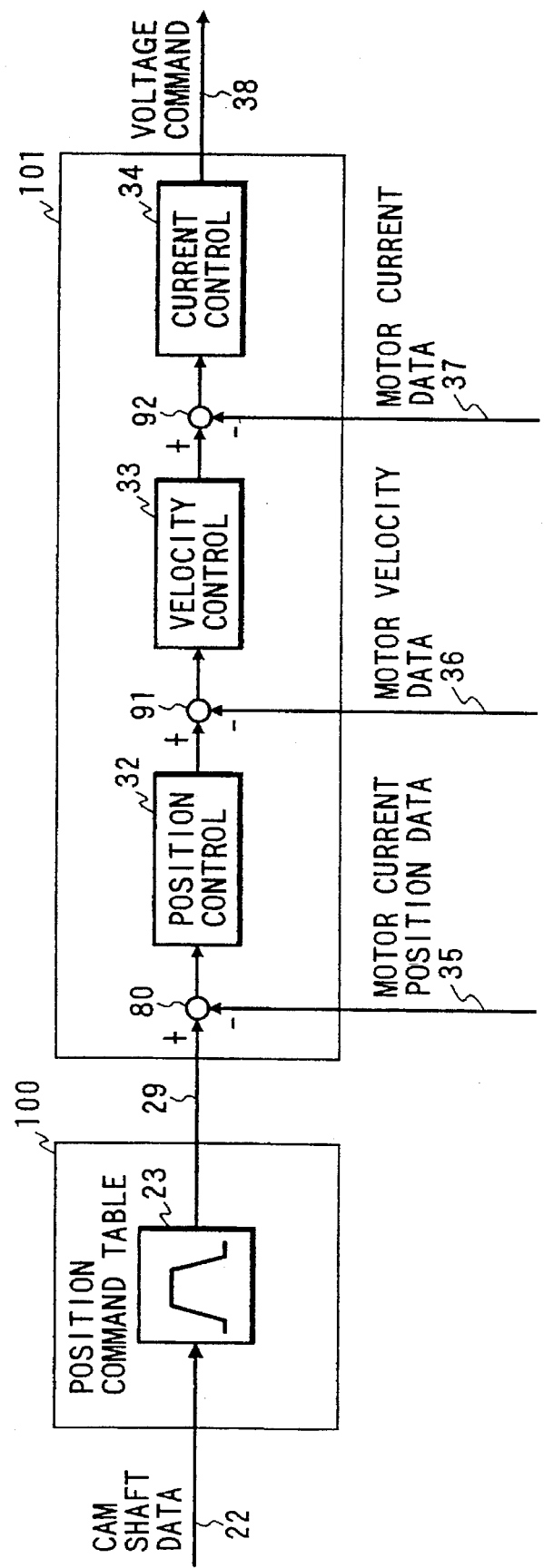
FIG. 15 is a functional block diagram of a conventional electronic cam apparatus.

As in the first embodiment, the motion command section 2 outputs to the servo drive section 3 the position command 29, velocity compensation command 30 and current compensation command 31 in the procedure as shown in a flowchart presented in FIG. 14, thereby controlling the motor to be controlled.

As in the conventional example and the first embodiment, the microprocessor 4 in the motion command section 2 finds the cam shaft data $\theta$ and cam shaft rotary velocity from $\omega$ the encoder interface 4 shown in FIG. 1, in step S60.

Then, the microprocessor 4 calculates the position command 29 from the cam shaft data $\theta$ using expression (1) in step S61:

$$p=f(\theta)=h1=(1+\cos\theta)/2+h2$$

Subsequently, the microprocessor 4 calculates the velocity compensation command reference value from the cam shaft data using expression (2) in step S62:

$$v=g(\theta)=\alpha\times\sin\theta$$

Then, the microprocessor calculates the current compensation command reference value using expression (3) in step S63:

$$i=h(\theta)=\gamma\times\cos\theta$$

Subsequently, since the velocity compensation command reference value and current compensation command reference value assume that the cam shaft is rotating at a given velocity (100 rps in this case), the velocity compensation command reference value and current compensation command reference value are multiplied by the rotary velocity ratio of the cam shaft by the rotary velocity ratio multipliers 27 and 28, respectively, to calculate the velocity compensation command 30 value and current compensation command 31 value, respectively, in step S64:

$$S'=v\times\omega/100$$

$$I'=v\times\omega/100$$

The microprocessor 4 in the motion command section 2 outputs the position command 29, velocity compensation command 30 and current compensation command 31 to the servo drive section 3 in step S65. As in the first embodiment, the servo drive section 3 performs processing to drive the motor to be controlled.

The control apparatus for the servo system for electronic cam control of the fourth embodiment can calculate by means of expressions not only the stroke of the motor which performs cam operation according to the rotary angle of the cam shaft but also the motor velocity and torque (motor current) according to the rotary angle and rotary velocity of the cam shaft. Tables need not be created and only giving the control apparatus for the servo system performing electronic cam control the data in the form of expressions allows compensations to be made in velocity control and current control by feed forward control with optimum values for cam operation. Hence, the response of the motor to sudden changes in the position command can be improved. If the velocity of the cam shaft is increased and the delay in the response of the motor to the command is conspicuous, the cam operation of the motor closer to the cam pattern can be achieved as compared to a case where the compensations are not made.

Also, as in the second embodiment, the fourth embodiment may have the velocity compensation expression data and current compensation expression data in the servo drive section to perform the arithmetic of velocity compensation and current compensation in the servo drive section.

Further, as in the third embodiment, if the fourth embodiment is given the load inertia, load torque, frictional torque, etc., as known data when the mechanical system to be controlled has been determined, the addition of the data to the expression of calculating the current compensation command provides the same effect as in the third embodiment.

The present invention has the following advantages with the above structure.

In the control apparatus for a servo system according to the invention, the motion command section calculates and outputs the position command equivalent to a cam stroke in the cam mechanism and the velocity compensation command on the basis of two data tables for a position command and a velocity compensation command. The servo drive section makes the velocity compensation and current compensation on the basis of the position command and the velocity compensation command from the motion command section. As a result, prediction control can be made and the deviation of servo control can be reduced in comparison with a case using only a position command.

Therefore, the response of the motor to sudden changes in the position command can be improved, and if the velocity of the cam shaft is increased and the delay in the response of the motor to the command is conspicuous, the cam operation of the motor closer to the cam pattern can be achieved as compared to a case where said compensations are not made.

Also, in the control apparatus for a servo system according to the invention, the motion command section calculates and outputs the position command equivalent to a cam stroke in the cam mechanism. The velocity compensation command and the current compensation command are also output in accordance with the three data tables for a position command. In addition, in regard to a velocity compensation command and a current compensation command, the servo drive section makes at least one of the position compensation and the velocity compensation on the basis of the position command, the velocity compensation command and the current compensation command from the motion command section.

As a result, prediction control can be made and the deviation of servo control can be reduced in comparison with a case using only a position command.

Therefore, the response of the motor to sudden changes in the position command can be improved, and if the velocity of the cam shaft is increased and the delay in the response of the motor to the command is conspicuous, the cam operation of the motor closer to the cam pattern can be achieved as compared to a case where the compensations are not made.

Further, since the servo drive section in the control apparatus for a servo system according to the invention includes at least one of a first multiplier for multiplying the velocity compensation command inputted from the motion command section by a constant, and a second multiplier for multiplying the current compensation command by a constant (gain), the effects of the velocity compensation and the current compensation can be varied. Also, an optimum prediction control can be made by adjusting it to a gain equivalent to a mechanical rigidity to which the servo motor to be controlled is attached.

Also, in the control apparatus for a servo system according to the invention, a motion command section outputs the position command equivalent to a cam stroke in the cam mechanism and cam shaft data equivalent to a cam shaft position in the cam mechanism in accordance with a data table for a position command. A servo drive section derives a velocity command and a current compensation command from two data tables for deriving a velocity compensation command and a current compensation command on the basis of the cam shaft data to make at least one of velocity compensation and current compensation in servo control processing. As a result, prediction control can be made and the deviation of servo control can be reduced in comparison with a case using only a position command. Also, parallel processing can be executed as a system.

Accordingly, the decrease of a load at the motion command section makes the processing speed high, and also the control apparatus is applicable to a system in which a plurality of motors perform the respectively independent cam operation in synchronism with one encoder. As a result, the performance of the whole system can be improved.

Further, in the data table for the current compensation command according to the invention, a synthesis of torque fluctuation data of a mechanical load connected to a servo motor and data for operation of an electronic cam is used as data. As a result, compensation can be made for the fluctuation of a mechanical load, and even in the case where a load torque fluctuates during the cam operation, an optimum feedforward control can be made for the fluctuation of the load torque.

Still further, according to the invention, a motion command section has a first formula, a second formula and a third formula representing electronic cam data for a position command, a velocity compensation command and a current compensation command, respectively to calculate and output the position command equivalent to a cam stroke in the cam mechanism, the velocity compensation command and the current compensation command in accordance with the electronic cam data. As a result, no data tables for electronic cam data are required, and the memory in the motion command section can be effectively used.

What is claimed is:

1. A control apparatus for a servo system which uses a servo motor to perform operations equivalent to those of a cam mechanism, comprising:

a motion command section having a first data table, a second data table and a third data table for a position command, a velocity compensation command and a current compensation command, respectively, for calculating and outputting a position command equivalent to a cam stroke of the cam mechanism, a velocity compensation command and a current compensation command in accordance with the data tables and cam shaft data equivalent to a cam shaft position of the cam mechanism; and a servo control section for controlling the servo motor on the basis of the position command from said motion command section, said servo control section effecting at least one of velocity compensation based on the velocity compensation command and current compensation based on the current compensation command.

2. The electronic cam control apparatus according to claim 1, wherein said servo drive section comprises at least one of a first multiplying means for multiplying the velocity compensation command inputted from the motion command section by a first constant, and a second multiplying means for multiplying the current compensation command by a second constant different from the first constant.

3. The cam control apparatus according to claim 1, wherein said motion command section further comprises a cam shaft velocity detector for detecting and outputting cam shaft rotary velocity information; and at least one Of a first multiplying means and a second multiplying means for multiplying the velocity compensation command and the current compensation command, respectively, by said cam shaft rotary velocity information.

4. A control apparatus for a servo system which uses a servo motor to perform operations equivalent to those of a cam mechanism, comprising:

a motion command section, having a first data table for a position command, for outputting a position command equivalent to a cam stroke of the cam mechanism and cam shaft data equivalent to a cam shaft position of the cam mechanism in accordance with said first data table; and a servo drive section having a second data table and a third data table for deriving a velocity compensation command and a current compensation command from the cam shaft data from the motion command section;

said servo drive section effecting at least one of velocity compensation based on the velocity compensation command and current compensation based on the current compensation command in servo control processing.

5. The cam control apparatus according to claim 4, wherein said motion command section further comprises a cam shaft velocity detector for detecting and outputting, to said servo drive section, cam shaft rotary velocity information; and wherein said servo drive section further comprises at least one of a first multiplying means and a second multiplying means for multiplying the velocity compensation command and the current compensation command, respectively, by said cam shaft rotary velocity information.

6. A control apparatus for a servo system which uses a servo motor to perform operations equivalent to those of a cam mechanism, comprising:

a motion command section having a first data table, a second data table and a third data table for a position command, a velocity compensation command and a current compensation command, respectively, for calculating and outputting a position command equivalent to a cam stroke of the cam mechanism, a velocity compensation command and a current compensation command in accordance with the data tables and cam shaft data equivalent to a cam shaft position of the cam mechanism; and a servo control section for controlling the servo motor on the basis of the position command from said motion command section, said servo control section effecting at least one of velocity compensation based on the velocity compensation command and current compensation based on the current compensation command, wherein a synthesis of torque fluctuation data of a mechanical load connected to the servo motor and data for operation of the electronic cam is used as data of said third data table for the current compensation command.

7. A control apparatus for a servo system which uses a servo motor to perform operations equivalent to those of a cam mechanism, comprising:

a motion command section having a first formula, a second formula and a third formula representing electronic cam data for a position command, a velocity compensation command and a current compensation command, respectively, for calculating and outputting a position command equivalent to a cam stroke in the cam mechanism, a velocity compensation command and a current compensation command in accordance with the formulae and cam shaft data equivalent to a cam shaft position of the cam mechanism; and a servo drive section for effecting at least one of position compensation and velocity compensation on the basis of the position command, the velocity compensation command and the current compensation command from the motion command section.

8. The control apparatus according to claim 7, wherein a synthesis of torque fluctuation data of a mechanical load connected to the servo motor and data for operation of the electronic cam is used as data of said third formula for the current compensation command.

9. The cam control apparatus according to claim 7, wherein said motion command section further comprises a cam shaft velocity detector for detecting and outputting cam shaft rotary velocity information; and at least one of a first multiplying means and a second multiplying means for multiplying the velocity compensation command and the current compensation command, respectively, by said cam shaft rotary velocity information.

10. A control apparatus for a servo system which uses a servo motor to perform operations equivalent to those of a cam mechanism, comprising:

a motion command section having a first data table, a second data table and a third data table for a position command, a velocity compensation command and a current compensation command, respectively, for calculating and outputting a position command equivalent to a cam stroke of the cam mechanism, a velocity compensation command and first and second current compensation command reference values in accordance with the data tables and cam shaft data equivalent to a cam shaft position of the cam mechanism;

said motion command section also having a cam shaft velocity detector for detecting and outputting cam shaft rotary velocity information, at least one of a first multiplying means and a second multiplying means for multiplying the velocity compensation command and the first current compensation command reference value, respectively, by the cam shaft rotary velocity information, and a summing means for calculating the current compensation command by adding the second current compensation command reference value to the result obtained by the second multiplying means; and a servo control section for controlling the servo motor on the basis of the position command from said motion command section, said servo control section effecting at least one of velocity compensation based on the velocity compensation command and current compensation based on the current compensation command.

11. A control apparatus for a servo system which uses a servo motor to perform operations equivalent to those of a cam mechanism, comprising:

a motion command section, having a first data table for a position command, for outputting a position command equivalent to a cam stroke of the cam mechanism and cam shaft data equivalent to a cam shaft position of the cam mechanism in accordance with said data table; and a servo drive section having a second data table and a third data table for deriving a velocity compensation command and a current compensation command from the cam shaft data from the motion command section;

said servo drive section effecting at least one of velocity compensation based on the velocity compensation command and current compensation based on the current compensation command;

wherein a synthesis of torque fluctuation data of a mechanical load connected to the servo motor and data for operation of the electronic cam is used as data of said third data table for the current compensation command.

* * * * *